United States Patent [19]
Brossier et al.

[11] Patent Number: 5,806,792
[45] Date of Patent: Sep. 15, 1998

[54] SUSPENSION DEVICE FOR A TURBOPROP ENGINE

[75] Inventors: Pascal Noël Brossier, Lieusaint; Carmen Miraucourt, Brie Comte Robert, both of France

[73] Assignee: Societe Nationale D'Etude Et De Construction De Moteurs D'Aviation "Snecma", Paris, France

[21] Appl. No.: 698,070

[22] Filed: Aug. 15, 1996

[30] Foreign Application Priority Data

Aug. 23, 1995 [FR] France .................................. 95 09997

[51] Int. Cl.⁶ .................................................. B64D 27/26
[52] U.S. Cl. ............................................. 244/54; 244/557
[58] Field of Search ................................ 244/54, 17.27; 248/554–557, 587, 590, 608; 60/39.31

[56] References Cited

U.S. PATENT DOCUMENTS

| 3,329,230 | 7/1967 | Castelet | 248/608 |
|---|---|---|---|
| 3,698,663 | 10/1972 | Balke et al. | 244/17.27 |
| 3,727,862 | 4/1973 | Kaufhold et al. | 244/54 |
| 4,717,094 | 1/1988 | Chee | 244/54 |
| 5,374,012 | 12/1994 | Marchand et al. | 248/608 |
| 5,524,847 | 6/1996 | Brodell et al. | 244/54 |

FOREIGN PATENT DOCUMENTS

| 0 303 405 | 2/1989 | European Pat. Off. . |
|---|---|---|
| 0 455 355 A1 | 11/1991 | European Pat. Off. . |
| 2 049 817 | 12/1980 | United Kingdom . |

*Primary Examiner*—Galen L. Barefoot
*Attorney, Agent, or Firm*—Oblon, Spivak, McClelland, Maier & Neustadt, P.C.

[57] ABSTRACT

A device for suspending a turboprop engine from a structural element of an aircraft comprises a suspension pylon parallel to the longitudinal axis of the engine and fixed to the structural element, resilient connections between the engine and the pylon and an arch fixed to the pylon, and a torsion bar carried by the arch so that the bar can pivot freely about its own axis, the opposite ends of the torsion bar being connected to opposite sides of the engine by respective lever and link rod assemblies so that the torsion bar takes up the reaction torque about the longitudinal axis of the engine.

1 Claim, 5 Drawing Sheets

SUSPENSION DEVICE FOR A TURBOPROP ENGINE

BACKGROUND OF THE INVENTION

1. Field of the Invention

The present invention relates to a device for suspending a turboprop engine from a structural element of an aircraft.

High-power turboprop engines exhibit a very high reaction torque about the axis of the engine, due to the fact that the air arrives at the propeller with a straight-line trajectory and leaves it with a helical trajectory, and it is necessary to suspend the engine in a manner which suitably restricts the angular offset of the engine in response to the reaction torque.

2. Summary of the Prior Art

FIG. 1 of the drawings illustrates a traditional suspension system suitable for a turboprop engine.

With this suspension the engine is fixed at the front by four attachment points 1 which are each connected to two rods 2 at one end thereof. At their other end, these rods are joined to an intermediate frame 3 which is linked to a frame 4 for connection to the wing of an aircraft. At the rear of the engine there is a point 5 for fixing the engine to the frame 4, and the assembly is fixed to the wing at the points 6, 7 and 8.

It is clear that, with such a suspension, the engine is encaged within a structure which does not facilitate the fitting of equipment on the engine. By way of example, the presence of the propeller speed reduction gear in such an engine entails a very significant increase in the total oil flow rate. The oil consumption specific to the reduction gear is about 60% of the total flow rate, and it is therefore necessary to provide a high-capacity oil reservoir, which the suspension makes difficult to house against the engine.

U.S. Pat. No. 3,201,069 discloses a turboprop engine suspended directly under an aircraft wing by one point at the rear, and, at the center, by an arch holding the engine at two points on its sides. This document gives no information regarding the means which withstands the reaction torque about the axis of the engine.

U.S. Pat. No. 4,875,655 discloses a lateral fixing for a turbine engine driving contrarotating propellers. This fixing includes a pylon parallel to the axis of the engine, a resilient fixing point at the front and an arch holding the engine by two resilient connections at the rear. However, with this type of engine, the trajectory of the air is straightened by the second propeller, and the trajectory of the air to the rear of the engine is practically straight. These engines therefore do not exhibit a very significant reaction torque about the axis of the engine.

Given that the angular offset of a turboprop engine under the effect of the reaction torque should not exceed 1° to 1.5°, it would be necessary, with large turboprop engines, to strengthen the resilient connections to the structure excessively, which would then no longer allow suppression of vibration.

SUMMARY OF THE INVENTION

The object of the present invention is to provide a suspension device suitable for high-power turboprop engines which makes it possible to clear the sides of the engine in order to facilitate access thereto for maintenance without taking the engine down, and to allow the fitting of bulky items of equipment on the engine, such as the oil reservoir for the reduction gear, and which, above all, makes it possible to hold the engine in a manner which is sufficiently flexible not to transmit vibrations from the engine to the aircraft, and sufficiently rigid in torsion about the axis of the engine such that it permits only a limited pivoting, of the order of 1 to 2%, under the effect of the reaction torque.

To this end, according to the invention there is provided a device for suspending a turboprop engine from a structural element of an aircraft, comprising:

- a suspension pylon fixed to said structural element of said aircraft substantially parallel to the longitudinal axis of said engine;
- a first resilient connection between said pylon and a rearward portion of said engine;
- an arch fixed to said pylon so as to be situated between said pylon and a forward portion of said engine in a plane perpendicular to said longitudinal axis of said engine;
- at least one second resilient connection between said arch and said forward portion of said engine;
- a torsion bar carried by said arch such that said torsion bar can pivot freely about its own longitudinal axis; and
- a pair of lever and link rod assemblies connecting the opposite ends of said torsion bar to opposite sides of said engine, whereby said torsion bar is capable of taking up the reaction torque about said longitudinal axis of said engine.

As a result of this arrangement, the first and second resilient connections are relieved of the function of taking up the torque transmitted by the reduction gear about the axis of the engine.

Other advantages and preferred features of the invention will become apparent from the following description of a preferred embodiment, given by way of example, with reference to the attached drawings.

DESCRIPTION OF THE PREFERRED EMBODIMENT

Figure 1:
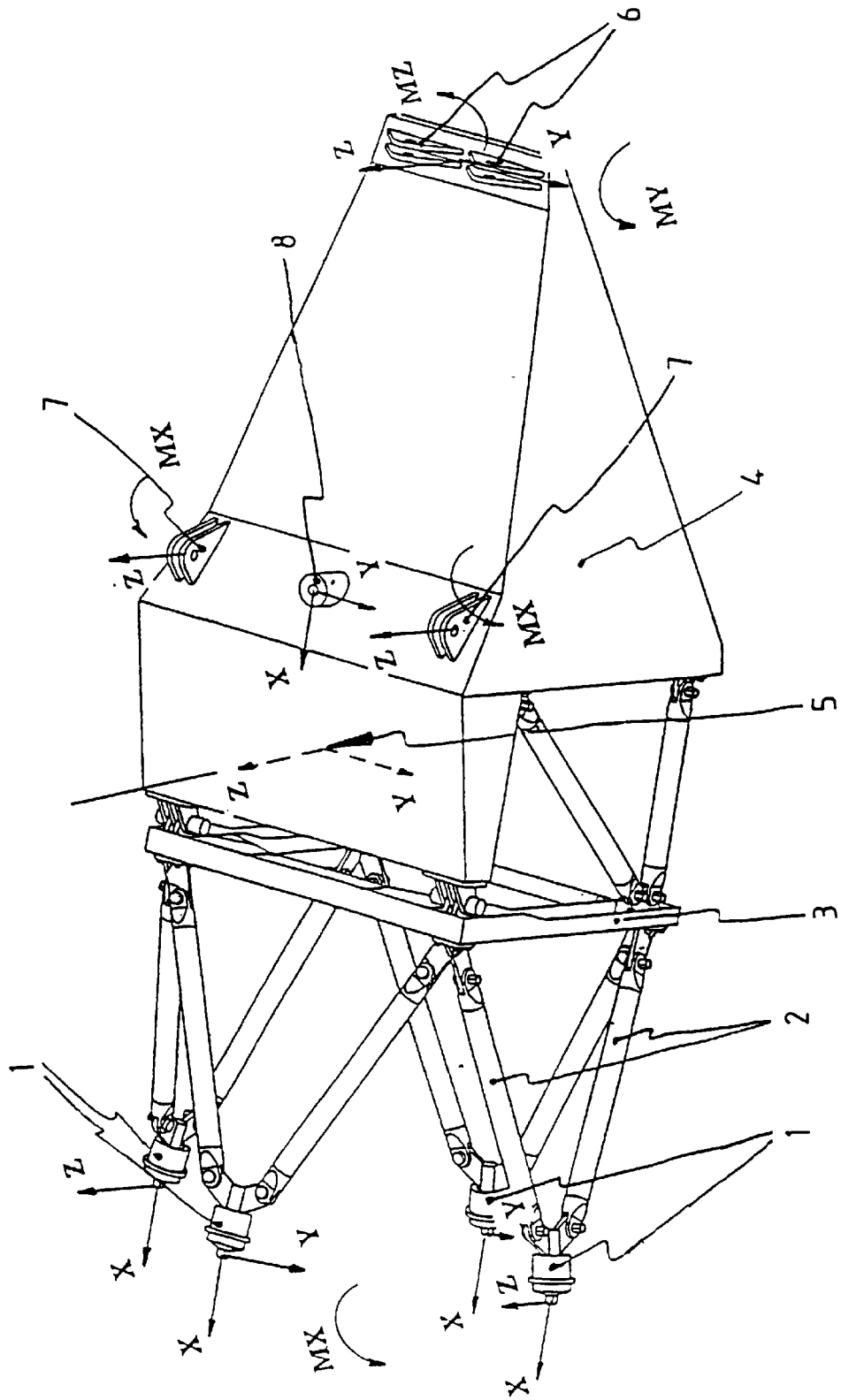
FIG. 1 illustrates diagrammatically a traditional suspension system for a turboprop engine.
Figure 2:
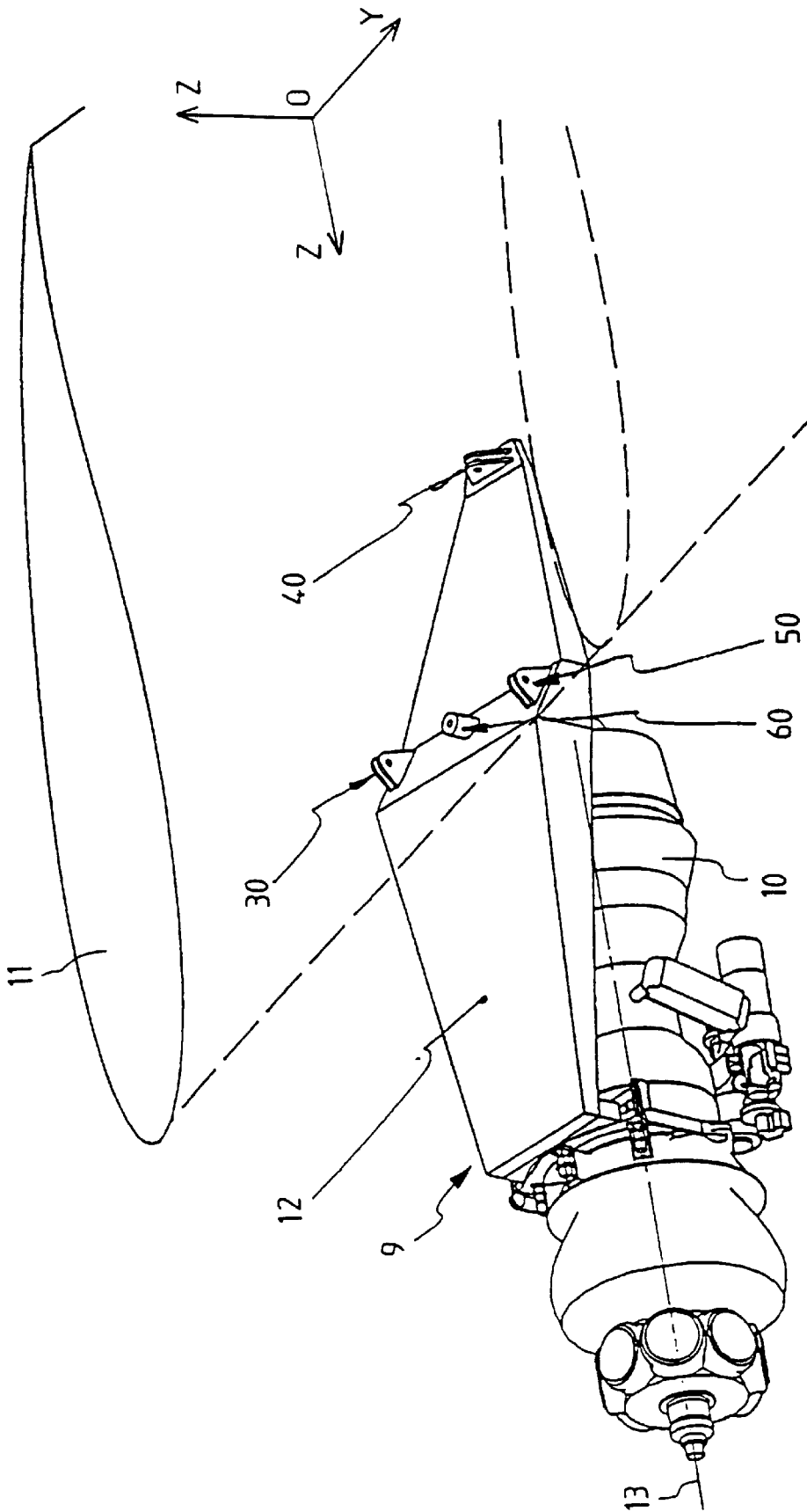
FIG. 2 shows diagrammatically an embodiment of the device in accordance with the invention for suspending a turboprop engine under the wing of an aircraft.
Figure 3:
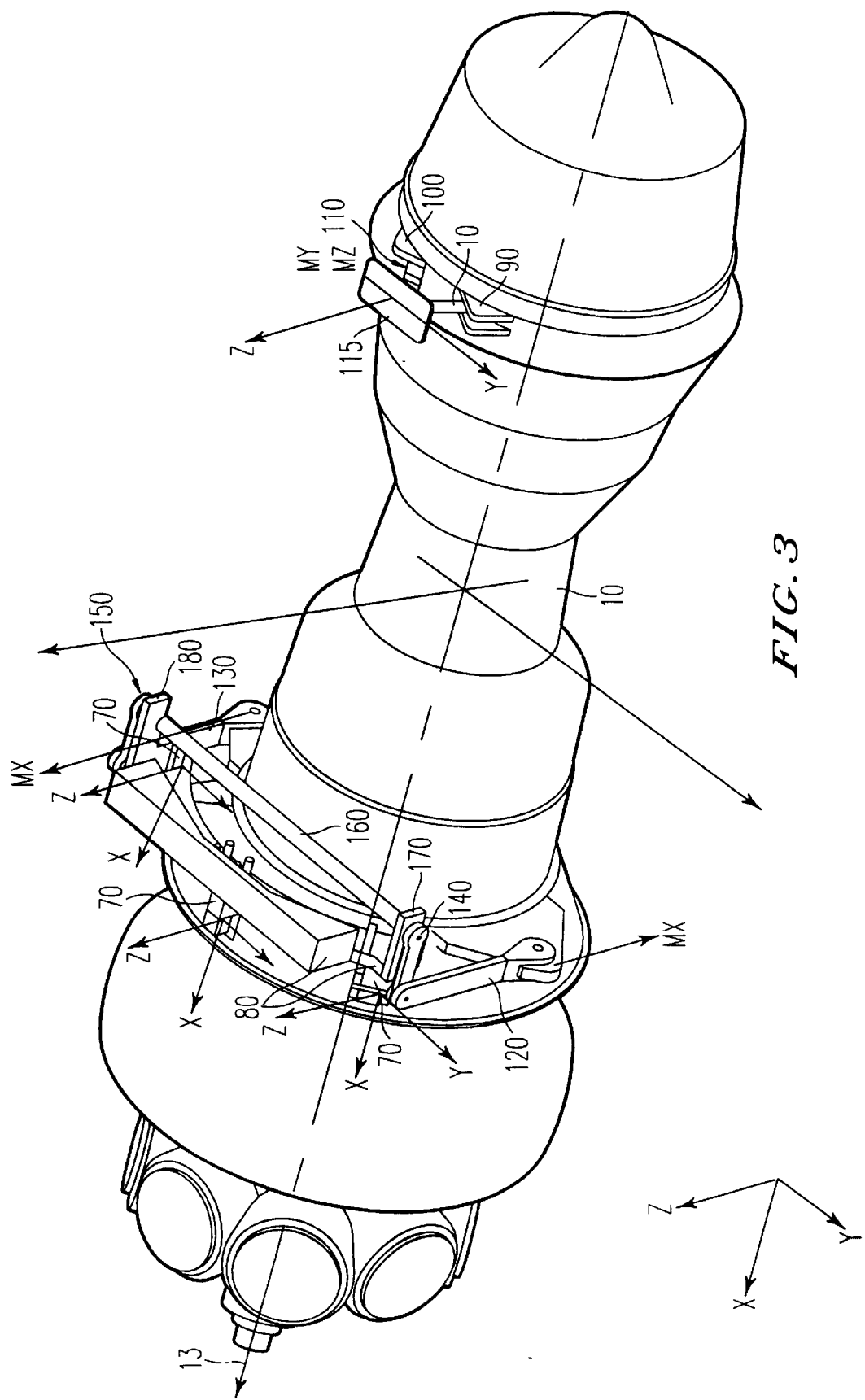
FIG. 3 shows the suspension device of FIG. 2 with the suspension pylon removed so that the remainder of the device can be seen clearly.
Figure 4:
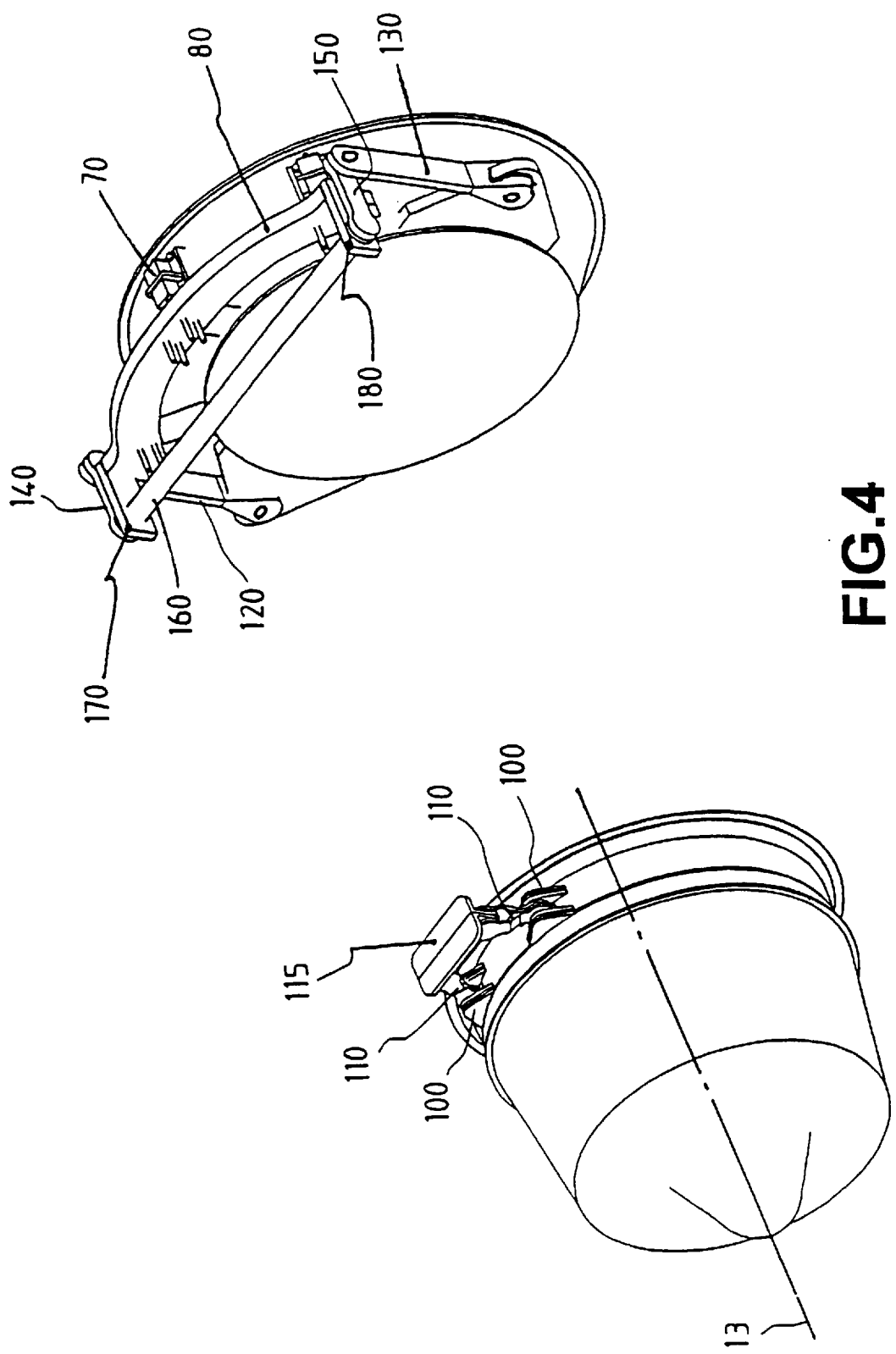
FIG. 4 shows the front and rear portions of the suspension device for connecting the engine to the suspension pylon; and, FIG. 5 shows a turboprop engine connected under the suspension pylon, and indicates the forces exerted by the suspension pylon on the structural support element for the pylon.

With reference to FIGS. 2 to 5, a device 9 is shown for suspending a turboprop engine 10 under the wing 11 of an aircraft.

This device comprises a suspension pylon 12 which has to withstand the forces transmitted by the engine 10 in the direction OX parallel to the longitudinal axis 13 of the engine 10, the horizontal direction OY perpendicular to OX, and the vertical direction OZ, and also to take up the torque transmitted by the propeller speed reduction gear about the axis OX.

The suspension pylon 12 is in the form of a horizontal component parallel to the axis OX, and has, on its upper face, three clevises 30, 40, 50 and a fixing stud 60 which provide the connection of the pylon 12 under the wing of the aircraft to be fitted with the turboprop engine 10.

The engine 10 is connected, at a forward position, to an arch 80 by means of three flexible connections 70 which withstand forces along the axes OX, OY and OZ, and the arch 80 is fixed to the lower face of the suspension pylon 12 by bolts (not shown).

The engine 10 also has, at a rearward position, two clevises 90, 100 which are connected to the suspension pylon 12 by two links 110 and a clevis 115. These suspension components withstand forces along the axes OY and OZ, and moments MY and MZ about the axes OY and OZ respectively.

The torque MX centered on the axis OX, and which is due to the presence of the propeller speed reduction gear, is transmitted by the engine 10 to two substantially parallel rods 120 and 130 which are pivotally connected at their lower ends to opposite sides of the engine 10 and at their upper ends to the free ends of respective levers 140 and 150 which are rigid with the opposite ends of a torsion bar 160. The torsion bar 160 is substantially parallel to the axis OY, and is supported by two bearings 170 and 180 on the arch 80 in such a way that it can rotate about its own longitudinal axis under the action of the torque MX. Thus, the torque MX of the propeller speed reduction gear is absorbed by the twisting of the bar 160.

The arch 80 and the rear clevis 115 are bolted to the lower face of the suspension pylon 12. The suspension of the engine 10 is thus located on one surface of the suspension pylon 12, and this arrangement makes much more space available on the engine 10 for installing equipment and carrying out maintenance operations.

Demounting of the engine 10 takes place at the arch 80 and the rear clevis 115. The multiple connection points between the engine 10 and these two components 80 and 115 are not disconnected.

The suspension pylon 12 is the support and the single interface for the aircraft-engine connections.

Figure 5:
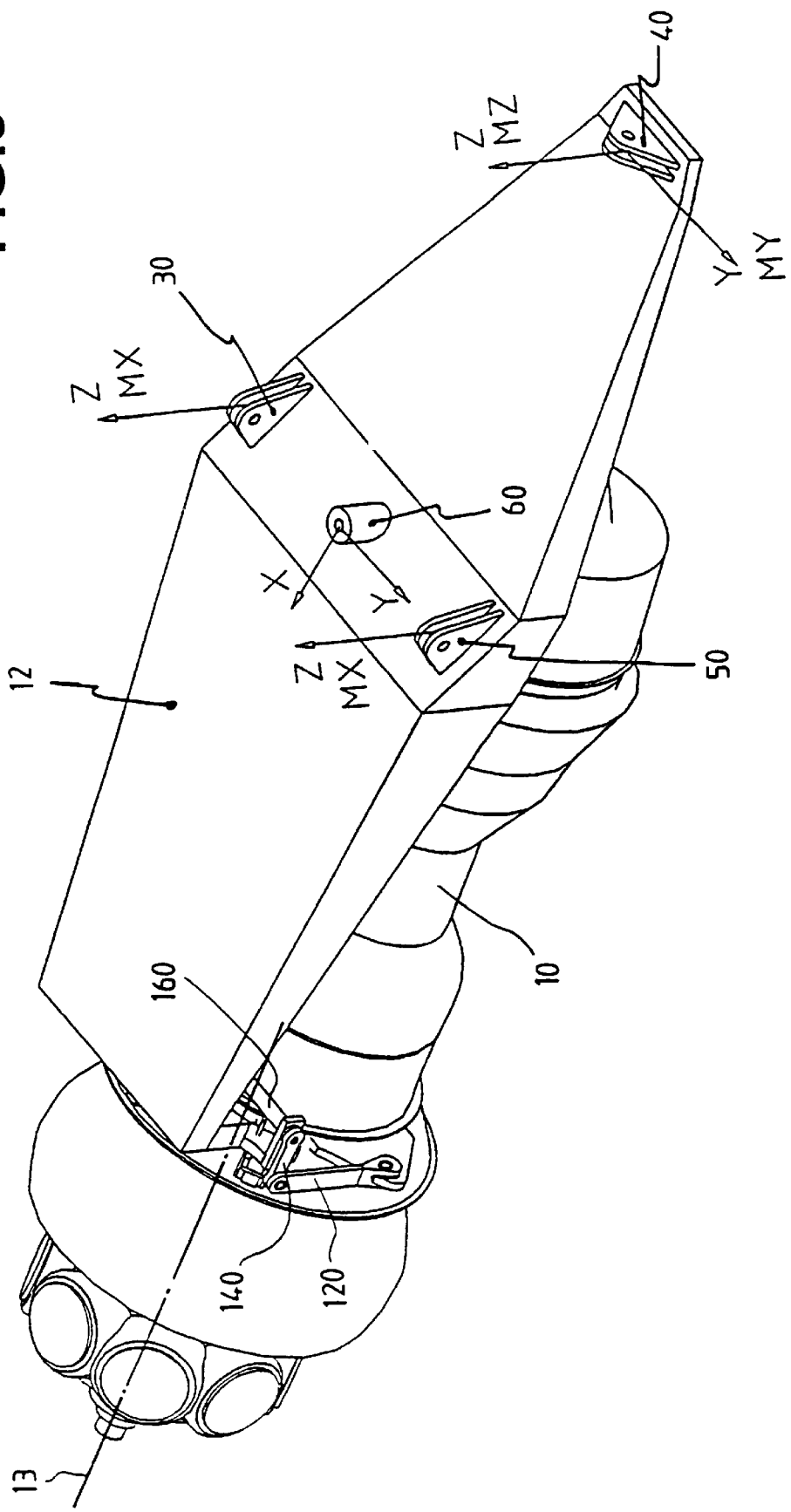

FIG. 5 shows the forces withstood by the clevises 30, 40, 50 and the fixing stud 60 which provide the connection between the suspension pylon 12 and the wing of the aircraft. The forces along the axes OX and OY are taken up by the fixing stud 60, and the forces along the axis OZ are distributed over the clevises 30, 40, 50. The moments MY and MZ are taken up by the rear clevis 40, and the moment MX is taken up by the clevises 30 and 50.

In the present embodiment, the engine 10 has been described as being mounted under the wing of the aircraft, but it will be appreciated that the suspension device in accordance with the invention can be adapted to any other positioning of the engine 10 on the aircraft.

We claim:

1. A device for suspending a turboprop engine from a structural element of an aircraft, comprising:

a suspension pylon fixed to said structural element of said aircraft substantially parallel to the longitudinal axis of said engine;

a first resilient connection between said pylon and a rearward portion of said engine;

an arch fixed to said pylon so as to be situated between said pylon and a forward portion of said engine in a plane perpendicular to said longitudinal axis of said engine;

at least one second resilient connection between said arch and said forward portion of said engine;

a torsion bar carried by said arch such that said torsion bar can pivot freely about its own longitudinal axis; and a pair of lever and link rod assemblies connecting the opposite ends of said torsion bar to opposite sides of said engine, whereby said torsion bar is capable of taking up the reaction torque about said longitudinal axis of said engine.

* * * * *